(12) United States Patent
Fukudome et al.

(10) Patent No.: US 11,536,389 B2
(45) Date of Patent: Dec. 27, 2022

(54) ELECTROMAGNETIC VALVE

(71) Applicant: Eagle Industry Co., Ltd., Tokyo (JP)

(72) Inventors: Kohei Fukudome, Tokyo (JP); Daichi Kurihara, Tokyo (JP); Keigo Shirafuji, Tokyo (JP)

(73) Assignee: EAGLE INDUSTRY CO., LTD.

(*) Notice: Subject to any disclaimer, the term of this patent is extended or adjusted under 35 U.S.C. 154(b) by 278 days.

(21) Appl. No.: 16/635,488

(22) PCT Filed: Aug. 27, 2018

(86) PCT No.: PCT/JP2018/031555
§ 371 (c)(1),
(2) Date: Jan. 30, 2020

(87) PCT Pub. No.: WO2019/044759
PCT Pub. Date: Mar. 7, 2019

(65) Prior Publication Data
US 2020/0370673 A1    Nov. 26, 2020

(30) Foreign Application Priority Data

Aug. 28, 2017  (JP) .............................. JP2017-163587

(51) Int. Cl.
*F16K 31/06* (2006.01)
*F04B 27/18* (2006.01)

(52) U.S. Cl.
CPC ...... *F16K 31/0675* (2013.01); *F04B 27/1804* (2013.01); *F16K 31/0603* (2013.01);
(Continued)

(58) Field of Classification Search
CPC .. F16K 31/06; F16K 31/0655; F16K 31/0675; F16K 31/0693; F16K 31/0603
See application file for complete search history.

(56) References Cited

U.S. PATENT DOCUMENTS 3,737,141 A * 6/1973 Zeuner ................ F16K 31/0655
                                                        251/129.07
5,915,416 A   6/1999 Okazaki et al. ......... 137/596.17
(Continued)

FOREIGN PATENT DOCUMENTS

CN      100396916    6/2008    .............. F04B 27/08
CN      101410620    4/2009    .............. F04B 27/14
(Continued)

OTHER PUBLICATIONS

Office Action issued in Korean patent application No. 10-2020-7004169, with English translation, dated Nov. 19, 2020, 11 pgs.
(Continued)

*Primary Examiner* — Matthew W Jellett
(74) *Attorney, Agent, or Firm* — Hayes Soloway P C.

(57) ABSTRACT

An electromagnetic valve has a valve housing; a valve body disposed inside the valve housing and movable in a reciprocating manner; an urging member configured to urge the valve body in one direction; and a drive device which is connected to the valve housing and applies a drive force to the valve body. A drive rod of the drive device includes a guide portion which faces an inner peripheral surface of a fixed iron core such that a movement of the drive rod is guided in an axial direction and a groove portion which is recessed in an inward radial direction from the guide portion and the groove portion is continuously formed from an inside of the valve housing to an inside of a movable iron core.

8 Claims, 10 Drawing Sheets

(52) U.S. Cl.
CPC .... *F16K 31/0693* (2013.01); *F04B 2027/185* (2013.01); *F04B 2027/1827* (2013.01); *F04B 2027/1854* (2013.01); *F04B 2027/1859* (2013.01)

(56) References Cited

U.S. PATENT DOCUMENTS

| | | | | |
|---|---|---|---|---|
| 6,354,811 | B1 | 3/2002 | Ota et al. | 417/222.2 |
| 6,358,017 | B1 | 3/2002 | Ota et al. | 417/222.2 |
| 6,435,848 | B1 | 8/2002 | Minami et al. | 417/440 |
| 6,443,707 | B1 | 9/2002 | Kimura et al. | 417/222.2 |
| 6,481,976 | B2 | 11/2002 | Kimura | F04B 27/1804 |
| 6,772,990 | B2 | 8/2004 | Sasaki et al. | 251/129.03 |
| 7,871,056 | B2* | 1/2011 | Kratzer | B60T 8/3675 |
| | | | | 251/129.02 |
| 8,079,827 | B2* | 12/2011 | Iwa | F04B 27/1804 |
| | | | | 417/222.2 |
| 8,251,673 | B2 | 8/2012 | Taguchi | 417/222.2 |
| 8,282,072 | B2* | 10/2012 | Kratzer | F16K 31/0665 |
| | | | | 137/315.01 |
| 8,651,826 | B2 | 2/2014 | Futakuchi | F04B 27/1804 |
| 9,132,714 | B2 | 9/2015 | Futakuchi | F04B 27/1804 |
| 9,410,514 | B2 | 8/2016 | Watanabe | F04B 49/08 |
| 9,599,249 | B2* | 3/2017 | Holmes | F16K 31/0693 |
| 10,900,388 | B2* | 1/2021 | Goll | F16K 27/048 |
| 11,015,730 | B2* | 5/2021 | Kasagi | F16K 11/07 |
| 2001/0003573 | A1 | 6/2001 | Kimura et al. | 417/222.2 |
| 2004/0057840 | A1 | 3/2004 | Hirota | 417/222.2 |
| 2004/0191078 | A1 | 9/2004 | Yoshihiro et al. | 417/222.2 |
| 2005/0178991 | A1* | 8/2005 | Goossens | B60T 8/363 |
| | | | | 251/129.07 |
| 2005/0211939 | A1 | 9/2005 | Morisawa et al. | 251/129.15 |
| 2005/0254961 | A1 | 11/2005 | Kawamura et al. | F04B 1/26 |
| 2008/0138213 | A1 | 6/2008 | Umemura et al. | 417/222.2 |
| 2009/0026399 | A1* | 1/2009 | Ishibashi | F16K 31/0613 |
| | | | | 251/129.15 |
| 2009/0183786 | A1 | 7/2009 | Iwa et al. | 137/487.5 |
| 2010/0068074 | A1 | 3/2010 | Shimada | F04B 27/1804 |
| 2011/0091334 | A1 | 4/2011 | Taguchi et al. | 417/222.1 |
| 2012/0198992 | A1 | 8/2012 | Futakuchi et al. | 91/505 |
| 2012/0198993 | A1 | 8/2012 | Fukudome et al. | 91/505 |
| 2013/0061959 | A1* | 3/2013 | Stephens | F15B 21/041 |
| | | | | 137/544 |
| 2013/0291963 | A1 | 11/2013 | Futakuchi et al. | 137/487.5 |
| 2014/0248163 | A1 | 9/2014 | Lee et al. | F04B 27/1804 |
| 2018/0003313 | A1 | 1/2018 | Schnelker et al. | F16K 31/0693 |

FOREIGN PATENT DOCUMENTS

| | | | | |
|---|---|---|---|---|
| CN | 103671102 | | 3/2014 | F04C 14/22 |
| CN | 106090266 | | 11/2016 | F16K 1/36 |
| EP | 1099852 | | 5/2001 | F04B 27/18 |
| EP | 1279831 | | 1/2003 | F04B 27/18 |
| EP | 1333177 | | 8/2003 | F04B 27/18 |
| EP | 1462650 | | 9/2004 | F04B 27/18 |
| EP | 1479908 | | 11/2004 | F04B 27/18 |
| EP | 1582742 | | 10/2005 | F04B 27/18 |
| EP | 1852606 | | 11/2007 | F04B 27/18 |
| EP | 1895162 | | 3/2008 | F04B 27/14 |
| EP | 1995460 | | 11/2008 | F04B 27/14 |
| EP | 2090779 | | 8/2009 | F04B 27/14 |
| EP | 2857681 | | 4/2015 | F04B 27/14 |
| JP | S5531029 | | 2/1980 | F16K 31/06 |
| JP | H058152 | | 2/1993 | F16K 31/06 |
| JP | H116578 | | 1/1999 | F16K 11/056 |
| JP | H1162825 | | 3/1999 | F04B 27/14 |
| JP | 2001132632 | | 5/2001 | F04B 27/14 |
| JP | 201165055 | | 6/2001 | F04B 27/14 |
| JP | 2004116349 | | 4/2004 | B60H 1/32 |
| JP | 2004156575 | | 6/2004 | F04B 27/14 |
| JP | 2004293497 | | 10/2004 | F04B 27/14 |
| JP | 2005120972 | | 5/2005 | F04B 27/14 |
| JP | 2007064028 | | 3/2007 | F04B 27/14 |
| JP | 2010-031786 | | 2/2012 | F04B 27/14 |
| JP | 5167121 | | 3/2013 | F04B 27/14 |
| WO | WO2006090760 | | 8/2006 | F04B 27/18 |
| WO | WO2007119380 | | 10/2007 | |
| WO | WO2011114841 | | 9/2011 | F04B 27/14 |
| WO | WO2012077439 | | 6/2012 | F04B 27/14 |

OTHER PUBLICATIONS

Chinese Office Action issued in corresponding application No. 201880050845.8, with translation, dated May 8, 2021 (10 pgs).
International Preliminary Report on Patentability (w/translations) issued in application No. PCT/JP2018/031555, dated Mar. 3, 2020 (8 pgs).
European Search Report issued in corresponding application No. 18777278.5, dated Aug. 4, 2020 (9 pgs).
European Official Action issued in corresponding application No. 18777278.5 dated Apr. 1, 2021 (7 pgs).
European Official Action issued in corresponding application No. 18850175.3 dated Apr. 13, 2021 (10 pgs).
Korean Office Action issued in corresponding application No. 10-2019-7029287, with translation, dated Aug. 24, 2020 (10 pgs).
Chinese Office Action issued in corresponding application No. 201880021361.0, with translation, dated Jul. 24, 2020 (13 pgs).
International Preliminary Report on Patentability (w/translation) issued in application No. PCT/JP2018/011063, dated Oct. 1, 2019 (11 pgs).
International Search Report and Written Opinion (w/translation) issued in application No. PCT/JP2018/011063, dated Jun. 26, 2018 (14 pgs).
PCT Notification of Transmittal of Translation of the International Preliminary Report on Patentability for application No. PCT/JP2011/053810, dated Nov. 1, 2012 (6 pgs).
International Search Report for corresponding appln. No. PCT/JP2011/053810, dated May 24, 2011 (1 pg).
International Preliminary Report on Patentability issued in application No. PCT/JP2014/051901, dated Aug. 13, 2015 (7 pgs).
International Search Report issued in application No. PCT/JP2014/051901, dated Apr. 18, 2014 (4 pgs).
Office Action issued in corresponding U.S. Appl. No. 16/498,329, dated Nov. 15, 2021 (6 pgs).
International Search Report and Written Opinion (w/translations) issued in application No. PCT/JP2018/031555, dated Nov. 27, 2018 (15 pgs).
European Office Action issued in corresponding application No. 18 777 278.5, dated Aug. 10, 2021 (8 pgs).
Chinese Office Action issued in corresponding application No. 201880050845.8, with translation, dated Jan. 19, 2022 (12 pgs).
Notice of Allowance issued in U.S. Appl. No. 16/498,329, dated May 18, 2022, 21 pages.
Decision of Rejection issued in Chinese Patent Appln. Serial No. 201880050845.8, dated Jul. 1, 2022, with English translation, 11 pages.

* cited by examiner

ELECTROMAGNETIC VALVE

TECHNICAL FIELD

The present invention relates to an electromagnetic valve which variably controls the volume or pressure of a working fluid and more particularly to an electromagnetic valve (capacity control valve) which controls a discharge amount of a variable displacement compressor or the like used in an air conditioning system of an automobile or the like.

BACKGROUND ART

As shown in Patent Citation 1, a variable displacement compressor used in an air conditioning system of an automobile or the like includes a rotation shaft rotationally driven by a drive force of an engine, a swash plate connected to the rotation shaft so that an inclination angle is variable, a compression piston connected to the swash plate, and the like and controls a fluid discharge amount by changing a stroke of the piston with a change in inclination angle of the swash plate. Particularly, in Patent Citation 1, since a capacity control valve driven to be opened and closed by an electromagnetic force is used, the inclination angle of the swash plate can be continuously changed by appropriately controlling a pressure in a control chamber while using suction pressure of a suction chamber sucking the fluid, a discharge pressure of a discharge chamber discharging the fluid pressurized by the piston, and a control pressure of the control chamber accommodating the swash plate.

The capacity control valve includes a valve housing which is formed of a metal material or a resin material, a valve body which is disposed inside the valve housing so as to be movable in a reciprocating manner, a pressure sensitive body which urges the valve body in one direction (toward a drive device), and a drive device which is connected to the valve housing and operates the valve body in the other direction. The valve body can open or close each of a port connected to the suction chamber formed in the valve housing, a port connected to the discharge chamber, and a port connected to the control chamber according to the position of the valve body in the axial direction.

The drive device includes a casing which is connected to the valve housing, a sleeve of which one end portion is closed, a cylindrical fixed iron core which is disposed inside the casing and the sleeve, a drive rod which is disposed inside the fixed iron core so as to be movable in a reciprocating manner and of which a front end at one end side is connected and fixed to the valve body, a movable iron core which is fixed to the other end side of the drive rod, a coil spring which urges the movable iron core against the drive force of the drive device, a coil which applies an electromagnetic drive force to the movable iron core, and the like.

Further, since a slight gap is formed between the drive rod and the fixed iron core and the fluid on the side of the valve housing flows into the movable iron core inside the sleeve through the gap, a pressure difference of the fluid between a space on the side of the valve housing and a peripheral space of the movable iron core is decreased and the capacity control valve can be operated with the designed performance in a normal state.

CITATION LIST

Patent Literature

Patent Citation 1: JP 5167121 B2 (sixth page, FIG. 1)

SUMMARY OF INVENTION

Technical Problem

However, in the capacity control valve of Patent Citation 1, since a gap between the movable iron core and the sleeve is small in order to accurately operate the movable side members (e.g., the movable iron core, the drive rod, and the valve body) in a reciprocating manner, there is a case in which the fluid cannot flow from the space on the side of the valve housing to the space on the side of the movable iron core in a short time. For that reason, there is a problem that a change in pressure of the fluid on the side of the movable iron core with respect to a change in pressure of the fluid on the side of the valve housing is delayed so that responsiveness is poor. Particularly, there is a problem that the capacity control valve cannot be operated with the designed performance due to such a pressure difference at the time of activating the variable displacement compressor having a large change in pressure on the side of the valve housing. Further, in Patent Citation 1, in order to operate the movable iron core in a reciprocating manner with the designed performance, a slit-groove extending in the axial direction is provided in the outer periphery of the movable iron core so that the fluid promptly moves between both end sides of the movable iron core in the axial direction. However, there are problems that the accuracy of the reciprocating operation of the movable iron core is deteriorated due to the groove, the processability becomes poor, and the cost becomes high.

The present invention has been made in view of such problems and an object thereof is to provide a low-cost electromagnetic valve having satisfactory responsiveness with respect to a change in pressure of a fluid on the side of a valve housing.

Solution to Problem

In order to solve the above-described technical problems, an electromagnetic valve according to a first aspect of the present invention is an electromagnetic valve characterized by including:

a valve housing; a valve body which is disposed inside the valve housing so as to be movable in a reciprocating manner; an urging member or means configured to urge the valve body in one direction; and a drive device which is connected to the valve housing and applies a drive force to the valve body, wherein the drive device includes a sleeve of which one end portion is closed, a cylindrical fixed iron core of which at least a part is disposed inside the sleeve, a movable iron core which is disposed inside the one end of the sleeve, a drive rod which is disposed inside the fixed iron core so as to be movable in a reciprocating manner and of which a first end is connected to the valve body and a second end is connected to the movable iron core, and a coil portion which applies an electromagnetic drive force to the movable iron core, wherein the drive rod includes a guide portion which faces an inner peripheral surface of the fixed iron core such that a movement of the drive rod is guided in an axial direction and a groove portion which is recessed in an inward radial direction from the guide portion, and wherein the groove portion is continuously formed from an inside of the valve housing to an inside of the movable iron core.

According to the first aspect, the guide portion formed in the drive rod faces the inner peripheral surface of the fixed iron core so as to be guided along the inner peripheral surface of the fixed iron core, and thus the drive rod can be accurately moved in a reciprocating manner in the axial direction. Further, a sufficient space is formed between the groove portion formed in the drive rod and the inner peripheral surface of the fixed iron core, so that a fluid can flow in a short time from the inner space of the valve housing to the inner space of the movable iron core through the space defined by groove portion. Accordingly, a pressure of the fluid on the side of the movable iron core can easily follow a change in pressure of the fluid on the side of the valve housing, a pressure difference therebetween can be decreased, and the electromagnetic valve can be operated with the set performance.

Preferably, the electromagnetic valve according to a second aspect of the present invention wherein the movable iron core is formed in a cylindrical shape having a through-hole penetrating in the axial direction and the groove portion of the drive rod communicates with the inner space of the movable iron core.

According to the second aspect, the groove portion of the drive rod communicates with the inner space of the movable iron core and a fluid can promptly flow from the inner space of the valve housing to the peripheral space of both ends of the movable iron core in the axial direction through the inner space of the movable iron core.

Preferably, the electromagnetic valve according to a third aspect of the present invention wherein the drive rod is fixed to the movable iron core in a state in which the guide portion is in contact with an inner peripheral surface of the movable iron core.

According to the third aspect, a space is secured between the groove portion of the drive rod and the inner peripheral surface of the movable iron core, the groove portion of the drive rod communicates with the inner space of the movable iron core, and the fixing strength between the drive rod and the movable iron core can be increased.

Preferably, the electromagnetic valve according to a fourth aspect of the present invention wherein a cross-section of the movable iron core is formed in a substantially round cylindrical shape.

According to the fourth aspect, since the inner space of the movable iron core communicates with the groove portion of the drive rod and the substantially round cylindrical shape means a cross-section without a passage such as a groove formed on the outer peripheral surface, the accuracy of the reciprocating operation of the movable iron core is high.

Preferably, the electromagnetic valve according to a fifth aspect of the present invention further includes:

a valve seat member that applies an urging force to the valve body in a direction resisting the drive force, is contractable in accordance with an increase of ambient pressure, and includes a valve seat surface engageable with the valve body, wherein the valve body is formed in a cylindrical shape penetrating in the axial direction and is fixed to the drive rod in a state in which the first end of the drive rod is inserted into the inside of the valve body.

According to the fifth aspect, since the inside of the valve body communicates with the outside of the valve body through a gap formed between the inner peripheral surface of the valve body and the groove portion of the drive rod, the valve seat member contracts in accordance with the increase of ambient pressure at the time of activating the variable displacement compressor, and the fluid flowing from a side of the valve seat member into the inside of the valve body is discharged to the outside of the valve body on the side of the drive rod through a gap formed between the inner peripheral surface of the valve body and the groove portion of the drive rod with a small fluid resistance, the pressure of the valve body on the side of the valve seat member can be promptly decreased.

DESCRIPTION OF EMBODIMENTS

A mode for implementing an electromagnetic valve according to the present invention will be described with reference to embodiments.

Embodiments

An electromagnetic valve according to an embodiment of the present invention will be described with reference to FIGS. 1 to 10.

Figure 1:
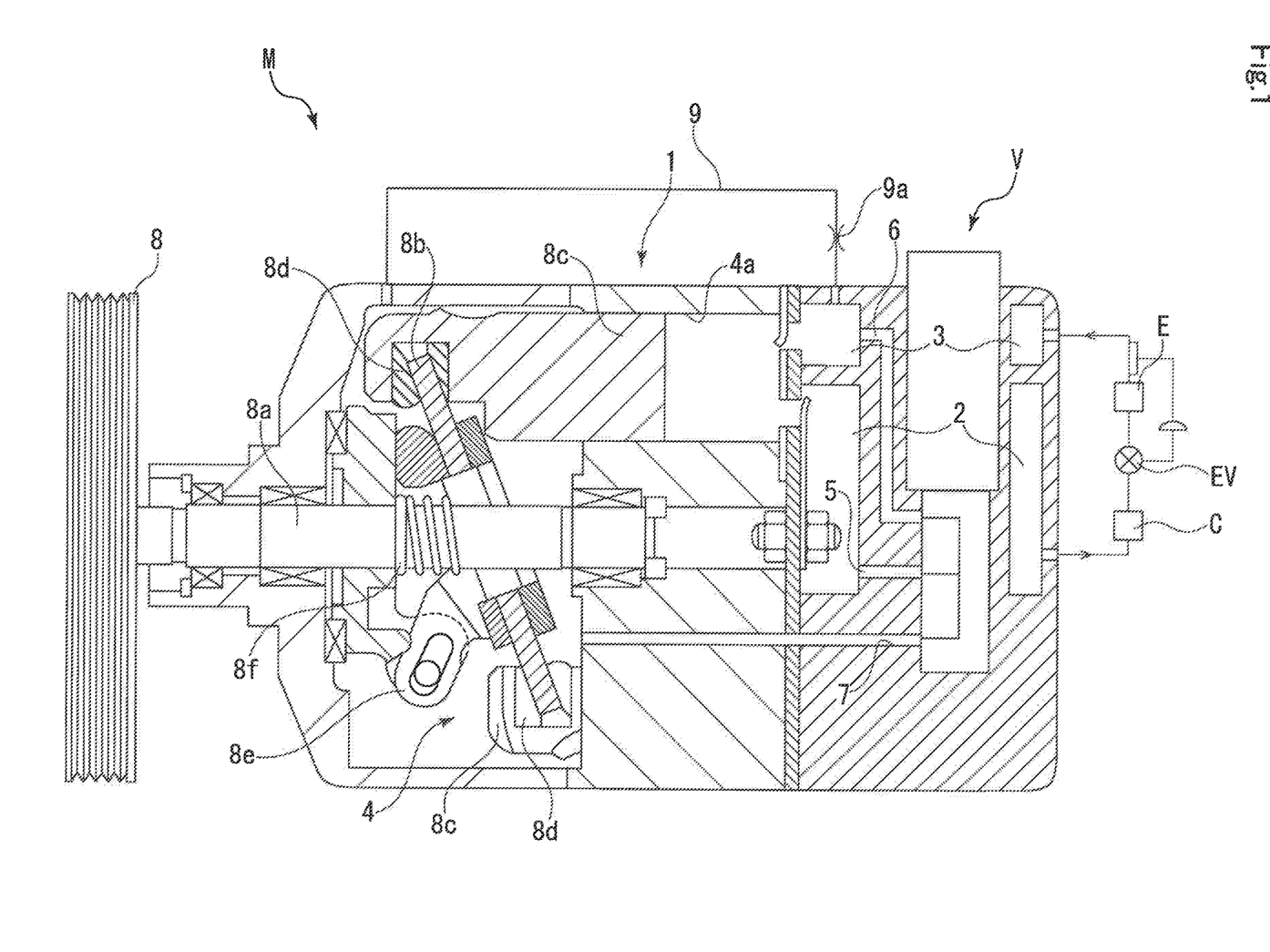
FIG. 1 is a schematic configuration diagram illustrating a swash plate type variable displacement compressor including a capacity control valve as an electromagnetic valve according to an embodiment of the present invention.

A variable displacement compressor M that employs an electromagnetic valve according to the embodiment of the present invention includes, as illustrated in FIG. 1, a casing 1 which includes a discharge chamber 2, a suction chamber 3, a control chamber 4, and a plurality of cylinders 4a and defines a communication passage 5 serving as a discharge side passage allowing the discharge chamber 2 and the control chamber 4 to communicate with each other, a communication passage 6 serving as a suction side passage allowing the suction chamber 3 and the control chamber 4 to communicate with each other, and a communication passage 7 serving as a discharge side passage and a suction side passage. A capacity control valve V (see FIG. 2) which is an electromagnetic valve according to the present invention is assembled to the casing 1.

Further, in the variable displacement compressor M, the discharge chamber 2 and the suction chamber 3 are connected to an external refrigerating/cooling circuit. Furthermore, the refrigerating/cooling circuit mentioned herein has a configuration in which a condenser C, an expansion valve EV, and an evaporator E are sequentially arranged and constitutes a main part of an air conditioning system.

Further, the variable displacement compressor M is provided with a communication passage 9 which allows the control chamber 4 and the suction chamber 3 to communicate with each other and the communication passage 9 is provided with a fixed orifice 9a which adjusts the pressure in the suction chamber 3 and the control chamber 4 in equilibrium.

Further, the variable displacement compressor M includes a driven pulley 8 which is connected to a V-belt (not illustrated) outside the casing 1, a rotation shaft 8a which is rotatably provided to protrude from the inside of the control chamber 4 toward the outside of the casing 1 and fixed to the driven pulley 8, a swash plate 8b which is connected to the rotation shaft 8a in an eccentric state by a hinge mechanism 8e, a plurality of pistons 8c which are fitted so as to be respectively movable in a reciprocating manner in the respective cylinders 4a, a plurality of connection members 8d which connect the smash plate Sb to the respective pistons 8c, and a spring 8f which is inserted through the rotation shaft 8a.

An inclination angle of the swash plate 8b is changeable in response to a control pressure Pc. This is because the inclination angle of the swash plate 8b is limited by the stroke width of the plurality of pistons 8c since the stroke width of the plurality of pistons 8c is changed by the control pressure Pc corresponding to a pressure inside the control chamber 4 although a force is always applied to the swash plate 8b due to the spring 8f and the hinge mechanism 8e. For that reason, although the inclination angle of the swash plate 8b becomes smaller as the control pressure Pc becomes higher, the inclination angle is limited by the hinge mechanism 8e when the control pressure becomes a certain pressure or more, so that the swash plate 8b is substantially perpendicular (a state in which the swash plate is slightly inclined rather than the perpendicular state) to the rotation shaft 8a. Furthermore, although the inclination angle of the swash plate 8b becomes larger as the control pressure Pc becomes lower, the inclination angle is limited by the hinge mechanism 8e when the control pressure becomes a certain pressure or less, so that the angle at that time becomes a maximum inclination angle.

Furthermore, when the swash plate 8b is substantially perpendicular to the rotation shaft 8a, the stroke amount of the piston 8c is minimized, the pressure applied to the fluid by the cylinder 4a and the piston 8c is minimized, and the cooling capacity of the air conditioning system is minimized. Meanwhile, when the swash plate 8b is at the maximum inclination angle, the stroke width of the piston 8c is maximized, the pressure applied to the fluid by the cylinder 4a and the piston 8c is maximized, and the cooling capacity of the air conditioning system is maximized. Here, the fluid is a mixture of a refrigerant gas and a small amount of a lubricating oil.

Further, the variable displacement compressor M adjusts the discharge amount by adjusting the electromagnetic force of the capacity control valve V by, for example, duty control and adjusting the control pressure Pc inside the control chamber 4. Specifically, when a current energizing a coil 87 of the capacity control valve V is adjusted, the opening degree of a first valve portion 52 and a second valve portion 53 to be described later is adjusted, and the amount of the fluid flowing into the control chamber 4 or flowing out of the control chamber 4 is adjusted, so that the control pressure Pc is adjusted. By this adjustment, the variable displacement compressor M changes the stroke amount of the plurality of pistons 8c.

Figure 2:
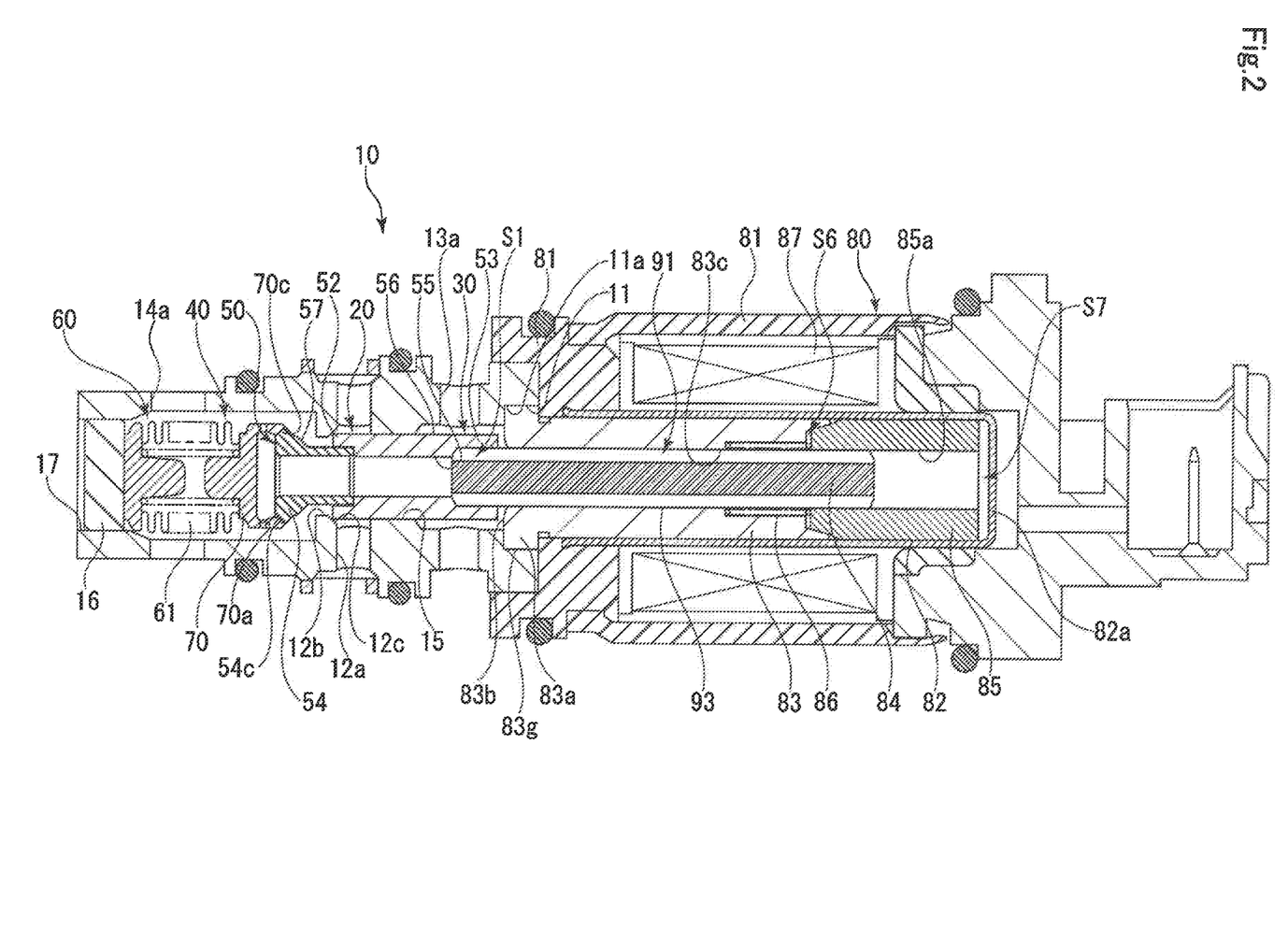
FIG. 2 is a cross-sectional view of the whole of capacity control valve in a state in which a coil is energized and a second valve portion is opened.

The capacity control valve V includes, as illustrated in FIG. 2, a valve housing 10 which is formed of a metal material or a resin material, a valve body 50 which is disposed so as to be movable in a reciprocating manner inside the valve housing 10, a pressure sensitive body 60 which urges the valve body 50 toward one direction (i.e., toward a drive device 80), the drive device 80 which is connected to the valve housing 10 and applies a drive force to the valve body 50, and the like.

Furthermore, for convenience of description below, the cross-sectional views of the capacity control valve V illustrated in FIGS. 2, 4, 7, 6, and 9 are indicated by cross-sections cut by two planes orthogonal to each other at the axes thereof.

The drive device 80 is a so-called solenoid including a casing 81 which is connected to the valve housing 10, a cylindrical sleeve 82 of which one end portion is closed, a cylindrical fixed iron core 83 which is disposed inside the casing 81 and the sleeve 82, a drive rod 84 which is disposed so as to be movable in a reciprocating manner inside the fixed iron core 83 and of which a first end at one side is connected to the valve body 50, a movable iron core 85 which is fixed to a second end, at the other side, of the drive rod 84, a coil spring 86 which urges the movable iron core 85 in a direction of opening the first valve portion 52, an exciting coil 87 which is wound around the outside of the sleeve 82 through a bobbin, and the like.

The fixed iron core 83 is formed of a rigid body that is a magnetic material such as iron or silicon steel. One end of the fixed iron core 83 is provided with an annular flange portion 83a which extends from the sleeve 82 toward the other end in the axial direction in the outer radial direction, the flange portion 83a is fitted into an aperture 11 of a valve housing 10 to be described later, and a large diameter surface 83g of the flange portion 83a is fixed while being in close contact with an inner peripheral surface 11a of the aperture 11.

The valve housing 10 is formed in a substantially cylindrical shape, one end of the valve housing 10 is provided with an aperture 17 into which a partition adjustment member 16 to be described later is press-inserted, the inner periphery of the valve housing 10 is provided with a small-diameter guide surface 15 which is in slidable contact with the valve body 50 to be described later, and the other end of the valve body 10 is provided with the aperture 11 having a concave shape in cross-section to which the drive device 80 is assembled and fixed.

Further, the valve housing 10 includes communication passages 12a, 12b, and 14a which serve as the discharge side passage, communication passages 13a and 14a which serve as the suction side passage along with an inner space 55 of the valve body 50, a first valve chamber 20 which is formed in the course of the discharge side passage, a second valve chamber 30 which is formed in the course of the suction side passage, and a third valve chamber 40 (a pressure chamber) which is formed on the side opposite to the second valve chamber 30 with respect to the first valve chamber 20. That is, the communication passage 14a and the third valve chamber 40 are formed so as to serve as a part of the discharge side passage and the suction side passage.

The valve body 50 includes a main valve body 56, a first valve portion 52 which is formed from a sub-valve body 57 and is provided in an end portion on the side of the fixed iron core 83 in the main valve body 56, a second valve portion 53 which is provided in an opposite end portion of the first valve portion 52, a third valve portion 54 which is provided in the sub-valve body 57 connected to the main valve body 56 by the retrofitting to the side opposite to the second valve portion 53 with respect to the first valve portion 52, and the like. Furthermore, since the sub-valve body 57 is connected to the main valve body 56, the sub-valve body moves together with the main valve body 56. Furthermore, the valve portions constitute valves while engaging with seat surfaces (or valve seat surfaces), respectively.

Further, the valve body 50 is formed in a substantially cylindrical shape having the inner space 55 penetrating from the second valve portion 53 to the third valve portion 54 in the axial direction and serving as the suction side passage.

Further, the valve body 50 can close the discharge side passage in such a manner that the first valve portion 52 is engaged with a first seat surface 12c formed in the edge portion of the communication passage 12b of the first valve chamber 20 and can close the suction side passage in such a manner that the second valve portion 53 is engaged with a second seat surface 83b formed in the end portion of the fixed iron core 83 in the second valve chamber 30.

The sub-valve body 57 includes the third valve portion 54 which is formed in a substantially cylindrical shape and is formed in a divergent shape toward the pressure sensitive body 60 and the third valve portion 54 includes an annular engagement surface 54c which faces an adapter 70 to be described later at the outer peripheral edge thereof.

The pressure sensitive body 60 (i.e., the valve seat member) includes a bellows 61, the adapter 70, and the like, one end of the bellows 61 is fixed to the partition adjustment member 16, and the adapter 70 is held by the other end (the free end) thereof. The adapter 70 is formed in a substantially U-shape in cross-sectional view such that a third seat surface 70c having an annular shape is provided in the front end thereof so as to sit on and separate from the engagement surface 54c of the third valve portion 54 while facing the engagement surface. A hole portion 70a is formed in the adapter 70 in the radial direction and the inner space 55 of the valve body 50 communicates with the third valve chamber 40 through the hole portion 70a.

The pressure sensitive body 60 is disposed in the third valve chamber 40, has a structure that urges the first valve portion 52 in an opening direction by the extension (expansion) of the bellows 61 when an ambient pressure becomes a predetermined pressure or more, and is operated to separate the third seat surface 70c of the adapter 70 from the engagement surface 54c of the third valve portion 54 by the contraction of the bellows 61.

Further, the partition adjustment member 16 constitutes a part of the valve housing 10 and defines the third valve chamber 40 to be described later, can adjust the pressure inside the third valve chamber 40 by appropriately changing a position in which the partition adjustment member 16 is press-inserted into the aperture 17, and can adjust the sensitivity of the pressure sensitive body 60 to be described later.

Figure 3:
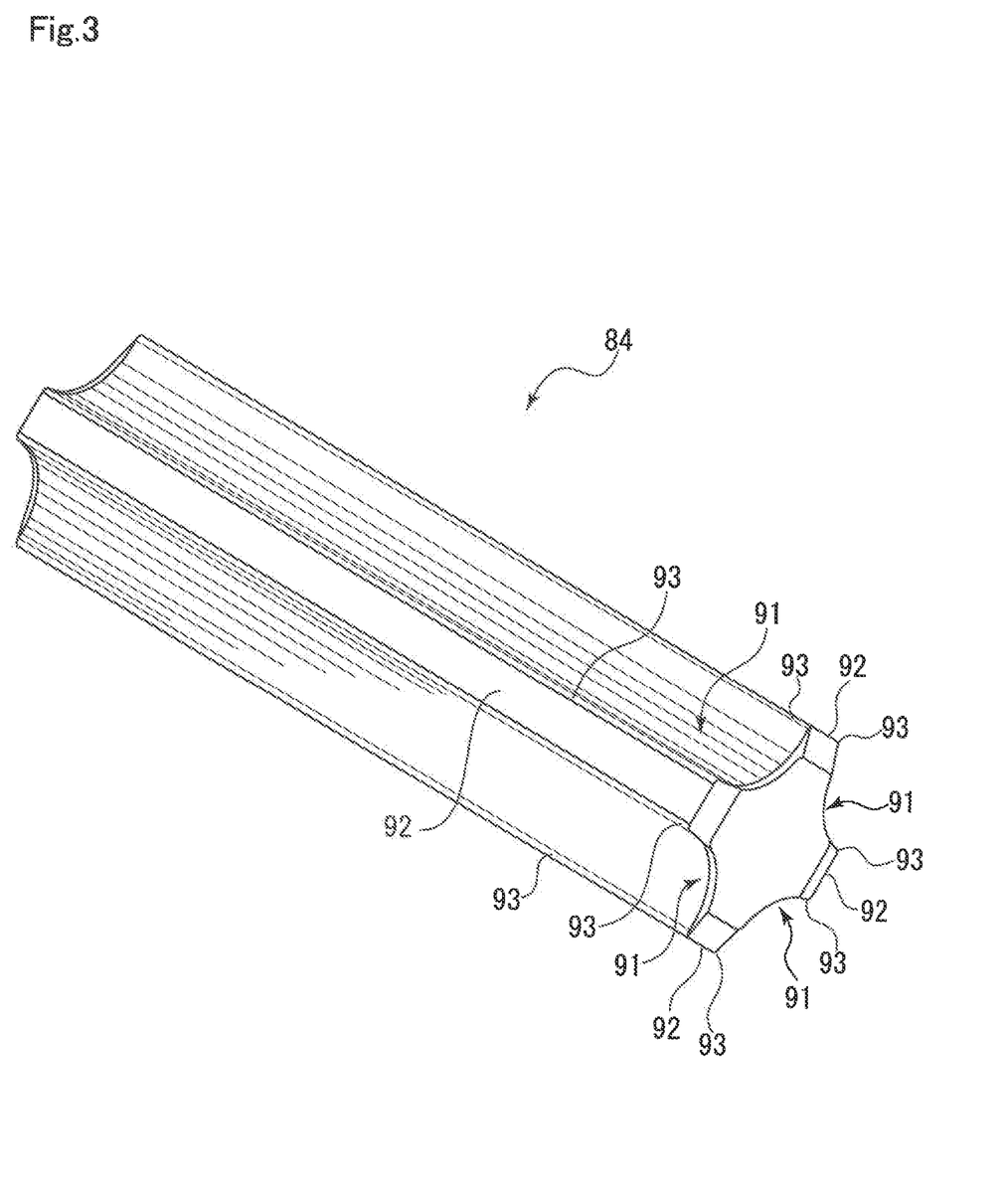
FIG. 3 is a perspective view illustrating a drive rod of the capacity control valve.

As illustrated in FIG. 3, the drive rod 84 is formed by extrusion molding or the like and has a shape with groove portions 91 equally distributed at four positions on the outer periphery and formed in the longitudinal direction. A flat surface 92 and a pair of curved surfaces 93 continuous to adjoining two of the groove portions 91 at both sides of the flat surface 92 in the width direction, respectively, are formed between the adjoining groove portions 91 (see FIG. 5).

As illustrated it FIG. 3, since the curved surface 93 is located on the outer diameter side with respect to the flat surface 92, the curved surface 93 takes a contact position when the drive rod 84 slides on a circular inner peripheral surface 83c of the fixed iron core 83, and serves as a guide portion guiding the movement direction of the drive rod 84 with respect to the fixed iron core 83 in the axial direction.

Figure 4:
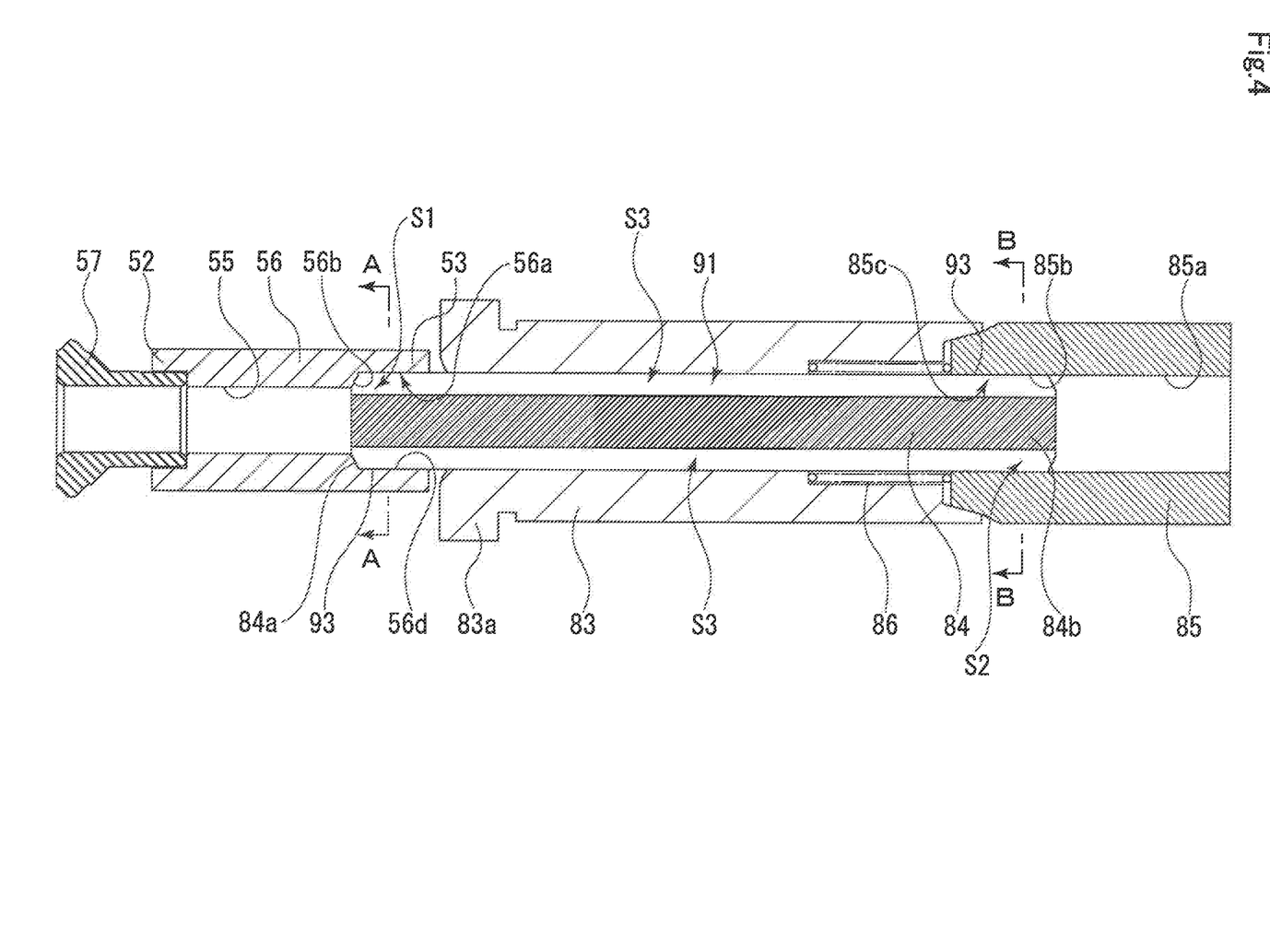
FIG. 4 is an enlarged view illustrating an assembly structure of a valve body, a fixed iron core, a movable iron core, and the drive rod included in the capacity control valve.

As illustrated in FIG. 4, the main valve body 56 is formed in a substantially cylindrical shape and one end 84a of the drive rod 84 is fixed to an aperture 56a on the side of the fixed iron core 83 in an inserted state. The aperture 56a is provided with a small-diameter step portion 56b and the first end 84a of the drive rod 84 contacts the step portion. Accordingly, it is possible to prevent an excessive insertion when the valve body 50 is moved toward the valve housing 10 by the drive device 80.

Figure 5:
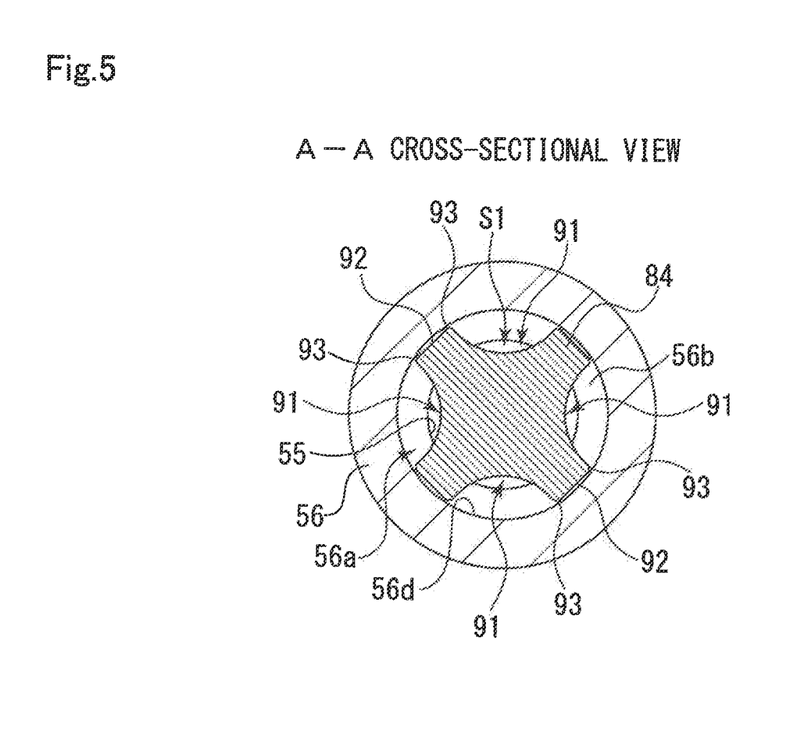
FIG. 5 is a cross-sectional view taken along line A-A of FIG. 4.

As illustrated in FIG. 5, as a fixed structure, the drive rod 84 is press-inserted into the aperture 56a of the main valve body 56 and the curved surface 93 of the drive rod 84 is in press-contact with a circular inner peripheral surface 56d of the main valve body 56 so that the drive rod 84 is integrated with the main valve body 56. A space S1 is formed between the groove portion 91 of the drive rod 84 and the inner peripheral surface 56d of the main valve body 56. Furthermore, the minimal diameter portion of the groove portion 91 is smaller than the inner diameter of the small-diameter step portion 56b formed in the main valve body 56 and the inside of the main valve body 56 communicates with the space S1 so that a fluid passage is secured.

The movable iron core 85 is formed in a cylindrical shape having a through-hole 85a opening to both ends in the axial direction and the second end 84b of the drive rod 84 is fixed to one aperture 85c in an inserted state.

Figure 6:
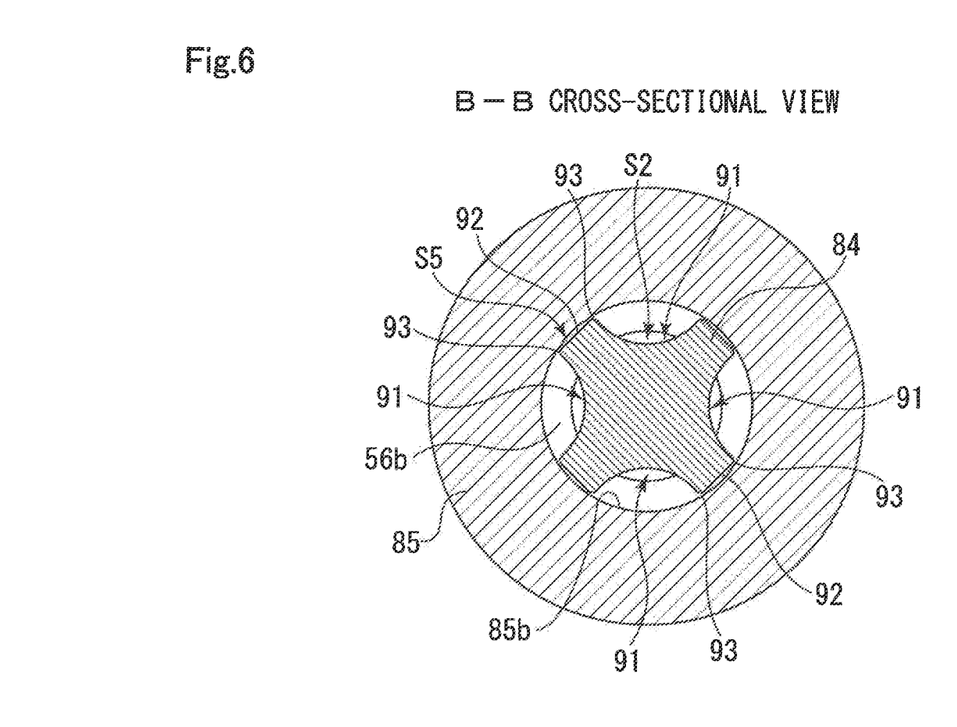
FIG. 6 is a cross-sectional view taken along line B-B of FIG. 4.

As illustrated in FIG. 6, as a fixed structure, the drive rod 84 is press-inserted into the aperture 85c of the movable iron core 85 and the curved surface 93 of the drive rod 84 is in press-contact with a circular inner peripheral surface 85b of the movable iron core 85 so that the drive rod 84 is integrated with the movable iron core 85. A space S2 is formed between the groove portion 91 of the drive rod 84 and the inner peripheral surface 85b of the movable iron core 85 and the inside of the movable iron core 85 communicates with the space S2 so that a fluid passage is secured. Furthermore, a space S5 is formed between the flat surface 92 and the inner peripheral surface 85b of the movable iron core 85 and constitutes a fluid passage similarly to the space S2.

The configuration of the capacity control valve V has been described so far. Here, each of a state in which the capacity control valve V is not energized (hereinafter, sometimes referred to as "non-energized state" not illustrated) and a state in which the capacity control valve V is energized (hereinafter, sometimes referred to as "energized state" illustrated in FIG. 7) will be described in detail.

When the capacity control valve V is in the non-energized state, the valve body 50 is pressed toward the drive device 80 by the pressure sensitive body 60 and the second valve portion 53 is engaged with the second seat surface 83b of the fixed iron core 83 so that the communication passages 13a and 14a corresponding to the suction side passage are closed. Meanwhile, the first valve portion 52 separates from the first seat surface 12c formed in the edge portion of the communication passage 12b and the communication passages 12a and 12b and the communication passage 14a corresponding to the discharge side passage communicate with each other.

In the non-energized state, the fluid inside the discharge chamber 2 flows from the discharge chamber 2 into the control chamber 4 (see FIG. 1) through the capacity control valve V since the communication passages 12a and 12b and the communication passage 14a corresponding to the discharge side passage communicate with each other by the capacity control valve V. This is caused because the discharge pressure Pd is a pressure higher than the control pressure Pc and the discharge pressure Pd and the control pressure Pc are balanced. The inflow of the fluid is performed until the discharge pressure Pd, the suction pressure Ps, and the control pressure Pc are balanced and the discharge pressure Pd, the suction pressure Ps, and the control pressure Pc are balanced and become a equalized pressure (Ps=Pc=Pd) if it is left for a long time.

When the variable displacement compressor M is activated while the discharge pressure Pd, the suction pressure Ps, and the control pressure Pc are equalized, the control pressure Pc at this time is much higher than the control pressure Pc in a continuous driving state. For this reason, the swash plate 8b is substantially perpendicular to the rotation shaft 8a and the stroke of the piston 8c is minimized. Further, the variable displacement compressor M starts the energization of the capacity control valve V in accordance with the activation thereof.

Figure 7:
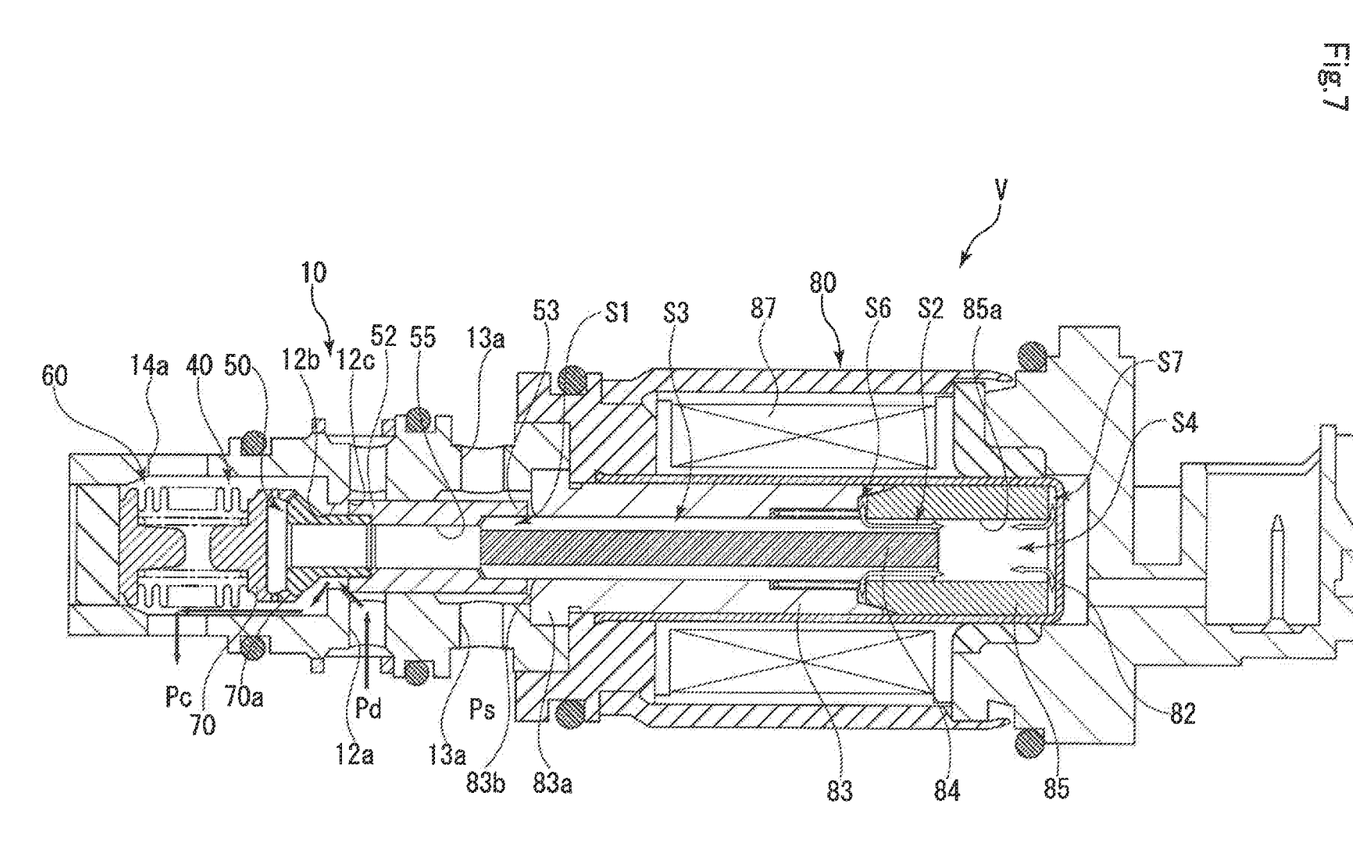
FIG. 7 is a cross-sectional view illustrating the whole of the capacity control valve in a state in which the coil is energized and a first valve portion is opened in normal control.

The capacity control valve V is excited by the energization of the coil 87 of the drive device 80 so that a magnetic force is generated. When the magnetic force exceeds the pressing force of the pressure sensitive body 60 and the coil spring 86 of the drive device 80, the movable iron core 85 is attracted to the fixed iron core 83 receiving the magnetic force, the drive rod 84 having the second end connected to the movable iron core 85 is driven, and the valve body 50 connected to the first end of the drive rod 84 is moved toward the pressure sensitive body 60 as illustrated in FIG. 7. Since the valve body 50 moves toward the pressure sensitive body 60, the second valve portion 53 separates from the second seat surface 83b of the fixed iron core 83, the communication passage 13a is opened, and the communication passage 13a, the space S1, the inner space 55 of the valve body 50, the hole portion 70a of the adapter 70, and the communication passage 14a communicate with one another so that a passage connecting the suction chamber 3 and the control chamber 4 is opened. Since the second valve portion 53 separates immediately after the non-energized state is switched to the energized state, the third valve chamber 40, the inner space 55 of the valve body 50, the space S1, and the second valve chamber 30 (see FIG. 2) communicate with one another so that the pressure of the control chamber 4 decreases.

Further, in the non-energized state, the movable iron core 85, the drive rod 84, and the valve body 50 are moved toward the sleeve 82 by the pressing force of the pressure sensitive body 60 and the coil spring 86. In the non-energized state, the second valve portion 53 is engaged with the second seat surface 83b of the fixed iron core 83 and the communication passages 13a and 14a corresponding to the suction side passage are interrupted so that a passage connecting the suction chamber 3 and the control chamber 4 is closed.

As illustrated in FIG. 7, in the normal control state, the capacity control valve V adjusts a current energizing the coil 87 so as to adjust the opening degree of the first valve portion 52 and adjusts the fluid flowing into the control chamber 4 (indicated by a black arrow) or flowing out of the control chamber 4 so as to adjust the control pressure Pc. In the maximum capacity state illustrated in FIG. 8, the first valve portion 52 is engaged with the first seat surface 12c formed on the edge portion of the communication passage 12b, the suction side passage is opened to maximum, and the communication passages 12a, 12b, and 14a corresponding to the discharge side passage are closed.

The space on the side of the movable iron core 85 in the sleeve 82 includes a space S6 between the movable iron core 85 and the fixed iron core 83, the space S2 between the through-hole 85a of the movable iron core 85 and the groove portion 91 of the drive rod 84, the space S5 (see FIG. 5) between the through-hole 85a of the movable iron core 85 and the flat surface 92 of the drive rod 84, the space S4 inside the through-hole 85a of the movable iron core 85, and a space S7 between the movable iron core 85 and a closed end surface 82a (see FIG. 2) of the sleeve 82. In the energized state, the communication passage 13a communicates with the space (S2, S4, S5, S6, and S7) on the side of the movable iron core 85 through the space S3.

When the movable iron core 85 moves toward the fixed iron core 83, the volume of the space S6 decreases, the fluid of the space S6 flows into the space S7 through the space S2, the space S5, and the space S4 and a part of the fluid is also moved toward the space S3.

Meanwhile, when the movable iron core 85 moves away from the fixed iron core 83, the volume of the space S7 decreases, the fluid of the space S7 flows into the space S6 through the space S4, the space S2, and the space S5, and a part of the fluid is also moved toward the space S3.

Further, when the fluid flows from the valve body 50, a part of the fluid flows into the space S6 through the space S3 and the rest flows into the space S7 through the space S2, the space S5, and the space S4.

In this way, since the inflow and the outflow of the fluid are performed between the space S6 and the space S7 through the space S4, the pressure of the fluid on the side of the movable iron core 85 can follow a change in pressure of the fluid on the side of the valve housing 10, a pressure therebetween can be decreased, and the capacity control valve V can be operated according to the designed performance. Further, since the drive rod 84 may be provided with the groove portion 91, the structure is simpler and easier to thereby obtain excellent processability as compared with a case in which the movable iron core as an iron block is machined, for example, a case in which the outer surface of the movable iron core is cut into a substantially D-shaped cross section or a through-hole penetrating in the radial direction of the movable iron core is machined.

When the energized state of the coil 87 is switched to the non-energized state thereof, the fluid is moved or discharged from the space S7 to the space S6, the suction chamber 3, and the control chamber 4 through a passage formed by the communication passage 13a, the hole portion 70a, the space S3, the space S5, and the space S2 in accordance with the movement of the movable iron core 85. In this way, since the inflow and the outflow of the fluid are performed in the space on the side of the movable iron core 85, the suction chamber 3, and the control chamber 4, the pressure of the fluid on the side of the movable iron core 85 can follow a change in pressure of the fluid on the side of the valve housing 10, a pressure difference therebetween can be decreased, and the capacity control valve V can be operated with the designed performance.

The bellows 61 has a structure that contracts when an ambient pressure becomes a predetermined pressure or more. In the structure of the embodiment, if the pressure inside the third valve chamber 40, that is, the control pressure Pc increases to a predetermined pressure or more when the capacity control valve V is energized at the time of driving the variable displacement compressor M after the compressor is left for a long time, the bellows 61 contracts, the third seat surface 70c of the adapter 70 separates from the engagement surface 54c of the third valve portion 54, the inner space 55 of the valve body 50 communicates with the third valve chamber 40, and the fluid of the third valve chamber 40 is promptly discharged to the suction chamber 3 through the second valve portion 53 as indicated by a black arrow illustrated in FIG. 9. At this time, as indicated by a dashed arrow of FIG. 9, the high-pressure fluid also flows from the control chamber 4 to the space on the side of the movable iron core 85 through the space S3. However, since the groove portion 91 opens the drive rod 84 at the axial end surface, the capacity control valve V can be operated with the set performance without applying a force in a direction separating the movable iron core 85 from the fixed iron core 83.

Figure 8:
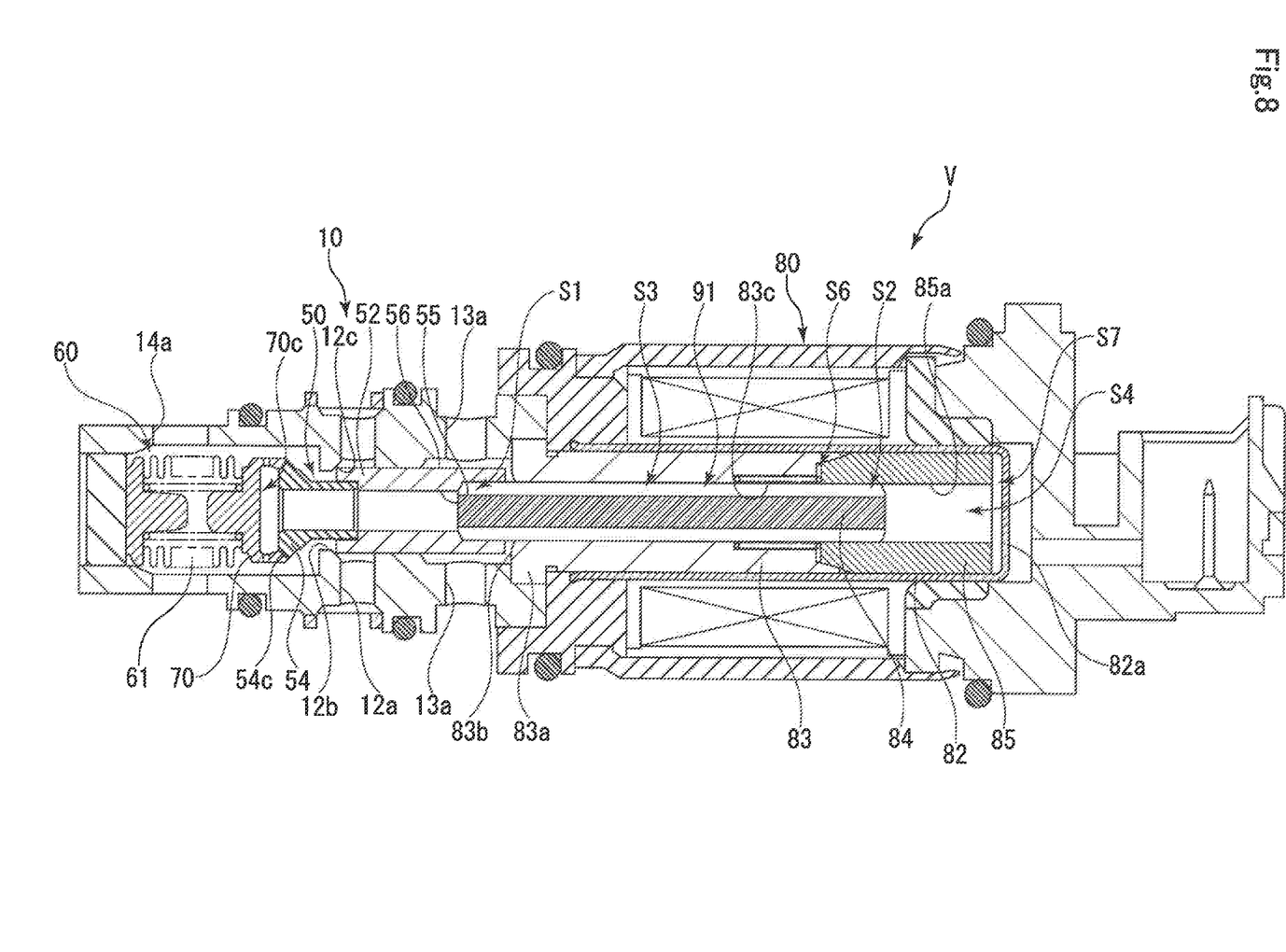
FIG. 8 is a cross-sectional view illustrating the whole of the capacity control valve in a maximum capacity state in which the coil is energized and a second valve portion is opened.
Figure 9:
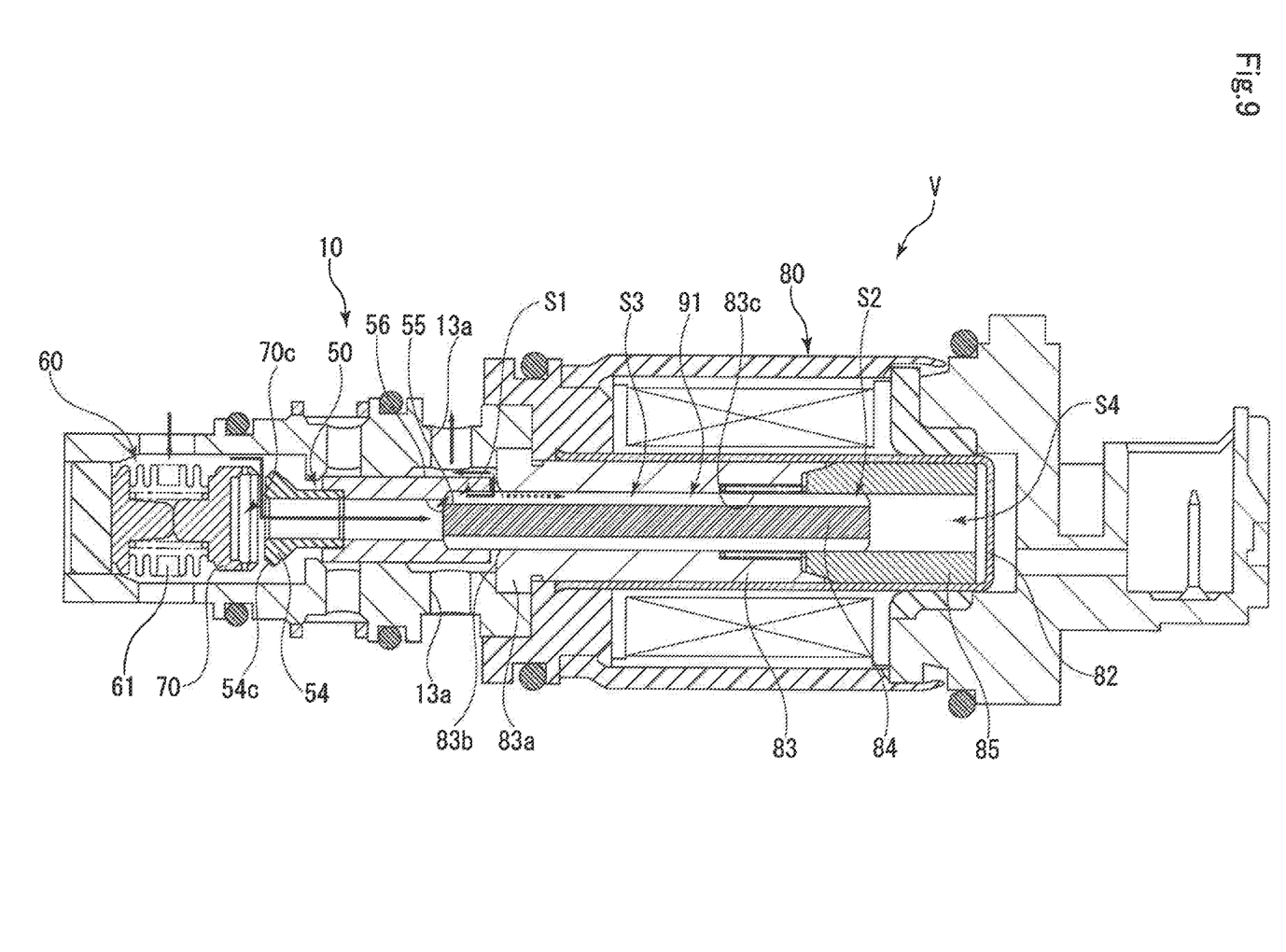
FIG. 9 is a cross-sectional view illustrating the whole of the capacity control valve in which the second valve portion and a third valve portion are opened immediately after the coil is energized.
Figure 10:
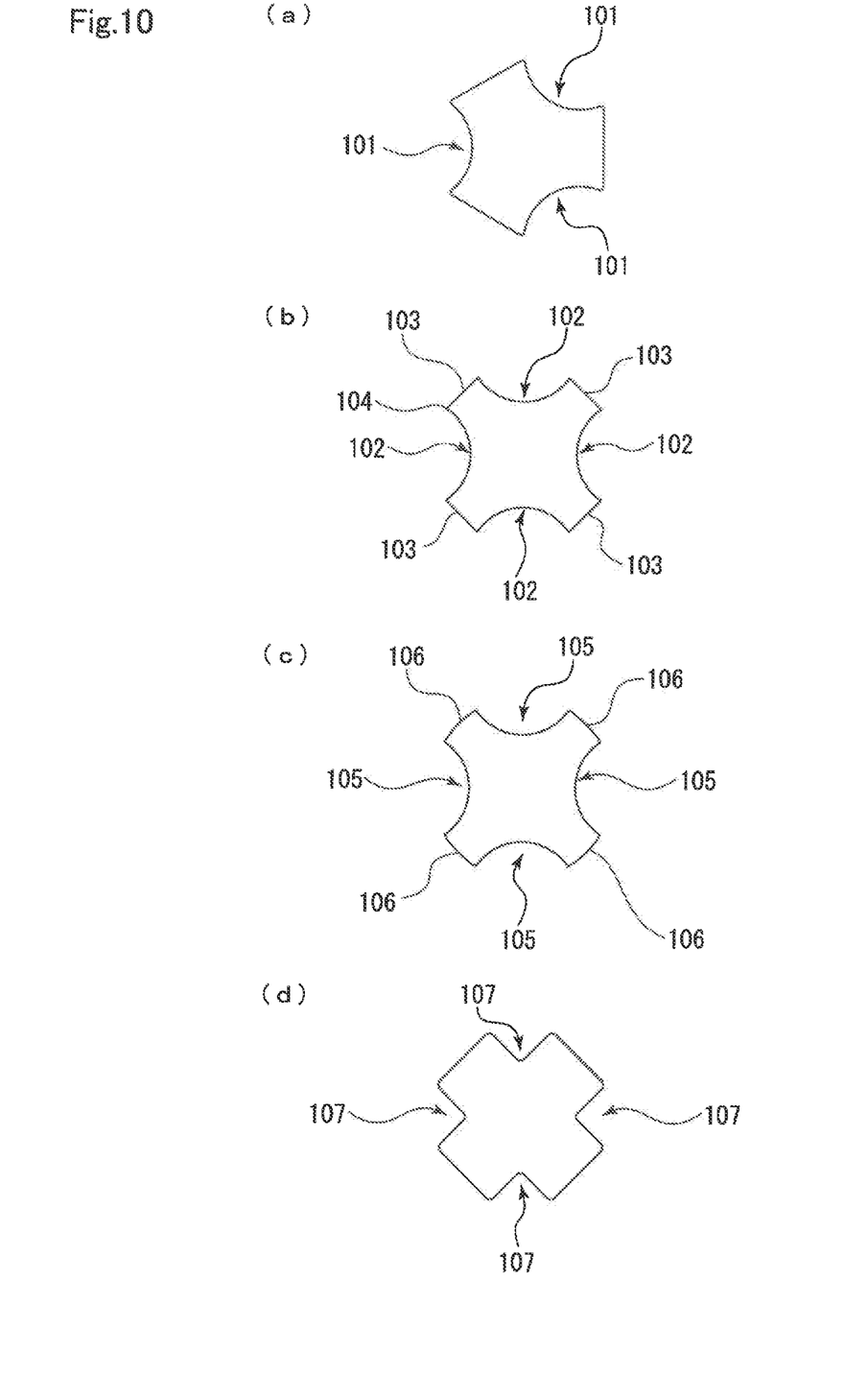
FIGS. 10(a)-10(d) are cross-sectional views illustrating a modified example of the drive rod.

Then, when the control pressure Pc decreases in accordance with the movement of the fluid so that the pressure inside the third valve chamber 40 also decreases and the pressure inside the third valve chamber 40 is lower than the urging force of the bellows 61, the bellows 61 presses the adapter 70 toward the third valve portion 54. Then, as illustrated in FIG. 8, the third seat surface 70c of the adapter 70 sits on the engagement surface 54c of the third valve portion 54 so that the communication between the inner space 55 and the third valve chamber 40 is closed.

In the space S3, since the groove portion 91 is formed with a predetermined depth and linearly communicates with the inside of the movable iron core 85, the resistance of the fluid is small, the fluid can flow from the space on the side of the valve housing 10 to the space S4 on the side of the movable iron core 85 through the space S3 in a short time, the pressure of the fluid on the side of the movable iron core 85 promptly follows a change in pressure of the fluid on the side of the valve housing 10, a pressure difference therebetween can be decreased, and the capacity control valve V can be operated with the set performance even at the activation thereof.

Further, since the fluid flowing to the space S4 flows into each of the space S6 between the movable iron core 85 and the fixed iron core 83 and the space S7 between the movable iron core 85 and the closed end surface 82a of the sleeve 82, the pressures of both of the space S6 and the space S7 of the movable iron core 85 are promptly balanced. Accordingly, the movable iron core 85 substantially does not receive an urging force toward the non-energized state from the fluid and the driving of the drive device 80 is stabilized.

Further, since the curved surface 93 formed in the drive rod 84 faces the inner peripheral surface 83c of the fixed iron core 83 with a small gap interposed therebetween and serves as a guide portion guided by the inner peripheral surface 83c when coming into contact with the inner peripheral surface 83c of the fixed iron core 83, the center axis of the drive rod 84 in the movement direction is guaranteed. Accordingly, the drive rod can be accurately operated in a reciprocating manner and the strength of the drive rod 84 is high.

Further, since the movable iron core 85 is formed in a cylindrical shape opening in the axial direction and the groove portion 91 of the drive rod 84 communicates with the inner space of the movable iron core 85, the fluid resistances inside the spaces (S2, S4, S5, S6, S7) on the side of the movable iron core 85 are small and the fluid can promptly flow from the space on the side of the valve housing 10 to the spaces (S2, S4, S5, S6, S7) on the side of the movable iron core 85 through the through-hole 85a of the movable iron core 85. Further, when the energized state is switched to the non-energized state as indicated by a white arrow in FIG. 7, the fluid can be directly moved from the space S7 to the space S6 through the through-hole 85a of the movable iron core 85 and the pressures of both of the space S6 and the space S7 of the movable iron core 85 can be promptly balanced.

Further, since the groove portion 91 of the drive rod 84 communicates with the inner space of the movable iron core 85 and the cross-section without a passage such as a groove formed on the outer peripheral surface side is a substantially round cylindrical shape, the reciprocating movement of the movable iron core 85 is high and the cost involved with machining is low. Further, when the lubricating oil mixed with the refrigerant gas accumulates in the space S7, the movable iron core 85 can discharge the lubricating oil toward a space on a side of the valve body 50 through the space S4, and the space S3.

Further, as described above, since the drive rod 84 is press-inserted and fixed in a state in which the curved surface 93 is in contact with the inner peripheral surface 85b of the movable iron core 85, the fixing strength between the drive rod 84 and the movable iron core 85 can be increased, the space between the groove portion 91 of the drive rod 84 and the inner peripheral surface 85b of the movable iron core 85 can be secured without using a particular fixing member or the like, and the groove portion 91 of the drive rod 84 can communicate with the inner space of the movable iron core 85.

Further, as described above, since the drive rod 84 is press-inserted and fixed in a state in which the curved surface 93 is in contact with the inner peripheral surface 56d of the valve body 50, the fixing strength between the valve body 50 and the movable iron core 85 can be increased, the space S1 between the groove portion 91 of the drive rod 84 and the inner peripheral surface 56d of the valve body 50 can be secured without using a particular fixing member or the like, and the groove portion 91 of the drive rod 84 can communicate with the inner space 55 of the valve body 50.

Further, since the space S1 formed between the groove portion 91 of the drive rod 84 and the inner peripheral surface 56d of the valve body 50 is formed along the axial direction of the valve body 50 and the drive rod 84, the fluid moving inside the inner space 55 of the valve body 50 in the axial direction can discharge an excess fluid with respect to a pressure necessary for the control chamber 4 to the outside (the third valve chamber 40) on the side of the drive rod 84 in the valve body 50 by a small fluid resistance.

Although the embodiment of the present invention has been described with reference to the drawings, the detailed configuration is not limited to the embodiment and modifications and additions within the scope of the present invention are included in the present invention.

For example, although it has been described such that the second seat surface 83b on which the second valve portion 53 sits is formed in the end portion of the fixed iron core 83 blocking one end of the valve housing 10, the present invention is not limited thereto. That is, the second seat surface may be formed separately from the valve housing 10 and the fixed iron core 83.

Further, although it has been described such that the communication passages 12a and 13a are equally distributed at two positions of the valve housing 10, the present invention is not limited thereto. For example, each of them may be formed only at the same side of the valve housing 10 and may be formed at a plurality of positions of the valve housing 10 in the circumferential direction as long as the structure strength is allowed.

Further, although it has been described such that the groove portion 91 is equally disposed at four positions of the outer periphery of the drive rod 84, the present invention is not limited thereto. For example, as illustrated in FIG. 10A, the groove portion 101 may be equally disposed at three positions or may be disposed only at one position of the outer periphery although not illustrated in the drawings and the groove portion may be formed in a spiral shape instead of a linear shape.

Further, a configuration including the groove portion 91, the flat surface 92, and the curved surface 93 is not limited to the shape of the outer periphery of the drive rod 84. For example, as illustrated in FIG. 10B, a configuration in which the groove portion 102 and the flat surface 103 are continuously provided and the curved surface is omitted may be employed. In this case, a corner portion 104 which is a boundary between the flat surface 103 and the groove portion 102 is located at the most outer radial side and serves as a guide portion which is close to the inner peripheral surface 83c of the fixed iron core 83.

Further, as illustrated in FIG. 10C, a surface 106 between the adjacent groove portions 105 may be formed by a curved surface along the inner peripheral surface 83c of the fixed iron core 83. In this case, the curved surface 106 serves as a guide portion.

Further, the groove portion is not limited to a curved surface illustrated in FIG. 3 and the like, but may be formed, for example, at a substantially right angle similarly to the groove portion 107 illustrated in FIG. 10D. Furthermore, the depth of the groove portion 91 is not limited to be constant in the longitudinal direction, but for example, a part of the groove portion 91 on the side of the valve body 50 may be deeper than another part of the groove portion 91 on a side of the movable iron core 85.

Further, a through-hole which communicates the inner space 55 of the valve body 50 with the third valve chamber 40 may be provided in the valve body 50 separately from the groove portion 91 communicating the inner space 55 of the valve body 50 with the third valve chamber 40.

Further, the position of the communication passage communicating with each of the discharge chamber 2, the suction chamber 3, and the control chamber 4 in the capacity control valve V is not limited to the above-described configuration and can be appropriately changed in response to the position of the discharge chamber 2, the suction chamber 3, and the control chamber 4 of the installed variable displacement compressor M.

Further, an example in which the capacity control valve V is the electromagnetic valve has been described, but other electromagnetic valves may be used as long as the drive rod is disposed inside the fixed iron core.

REFERENCE SIGNS LIST

2 Discharge chamber
3 Suction chamber
4 Control chamber
4a Cylinder
8a Rotation shaft
8b Swash plate
8c Piston
9 Communication passage
10 Valve housing
20 First valve chamber
30 Second valve chamber
40 Third valve chamber
50 Valve body
55 Valve body inner space
56 Main valve body
57 Sub-valve body
60 Pressure sensitive body (urging member)
61 Bellows
80 Drive device
82 Sleeve
83 Fixed iron core
83c Fixed iron core inner peripheral surface
84 Drive rod
85 Movable iron core
85b Inner peripheral surface
86 Coil spring (urging member)
87 Coil
91 Groove portion
92 Flat surface
93 Curved surface (guide portion)
M Variable displacement compressor
S1 to S7 Space
V Capacity control valve (electromagnetic valve)

The invention claimed is:

1. A capacity control valve comprising:
a valve housing provided with a suction port, a discharge port and a control port communicating with a suction chamber, a discharge chamber and a control chamber of a variable displacement compressor, respectively;
a valve body which is disposed inside the valve housing so as to be movable in a reciprocating manner;
an urging member configured to urge the valve body in one direction; and
a drive device which is connected to the valve housing and is configured to apply a drive force to the valve body, wherein
the drive device includes a sleeve of which one end portion is closed, a cylindrical fixed iron core of which at least a part is disposed inside the sleeve, a movable iron core which is disposed inside the one end portion of the sleeve and which has an inner space, a drive rod which is disposed inside the fixed iron core so as to be movable in a reciprocating manner and of which a first end is connected to the valve body and a second end is connected to the movable iron core, and a coil portion configured to apply an electromagnetic drive force to the movable iron core, wherein
the valve body is formed in a cylindrical shape, having an inner space configured to communicate the suction port and is connected to the drive rod in a state in which the drive rod is inserted to an inside of the valve body, wherein
the drive rod includes a guide portion which faces an inner peripheral surface of the fixed iron core such that a movement of the drive rod is guided in an axial direction and a groove portion which is recessed in an inward radial direction from the guide portion, wherein
the groove portion is continuously formed from an inside of the valve housing to an inside of the movable iron core, and
the inner space of the valve body is configured to communicate with the suction port and the inner space of the movable iron core through the groove portion.

2. The capacity control valve according to claim 1, wherein the drive rod is fixed to the movable iron core in a state in which the guide portion is in contact with an inner peripheral surface of the movable iron core.

3. The capacity control valve according to claim 1, wherein
a cross-section of the movable iron core is formed in a round cylindrical shape.

4. The capacity control valve according to claim 1, further comprising:
a valve seat member configured to apply an urging force to the valve body in a direction resisting the drive force, and includes a valve seat surface engageable with the valve body.

5. The capacity control valve according to claim 2, wherein
a cross-section of the movable iron core is formed in a round cylindrical shape.

6. The capacity control valve according to claim 2, further comprising:
a valve seat member configured to apply an urging force to the valve body in a direction resisting the drive force, and includes a valve seat surface engageable with the valve body.

7. The capacity control valve according to claim 3, further comprising:
a valve seat member configured to apply an urging force to the valve body in a direction resisting the drive force, and includes a valve seat surface engageable with the valve body.

8. The capacity control valve according to claim 5, further comprising:
a valve seat member configured to apply an urging force to the valve body in a direction resisting the drive force, and includes a valve seat surface engageable with the valve body.

* * * * *